(12) United States Patent
Dewitz et al.

(10) Patent No.: US 7,413,391 B2
(45) Date of Patent: Aug. 19, 2008

(54) COTTER PIN

(75) Inventors: Jerome D. Dewitz, Oconomowoc, WI (US); Brian Beardsley, Watertown, WI (US); Phillip Johnson, Naperville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 449 days.

(21) Appl. No.: 11/228,720

(22) Filed: Sep. 16, 2005

(65) Prior Publication Data

US 2007/0065257 A1    Mar. 22, 2007

(51) Int. Cl.
*F16B 21/14* (2006.01)
(52) U.S. Cl. ...................... 411/513; 411/213
(58) Field of Classification Search ................ 411/213, 411/513–515
See application file for complete search history.

(56) References Cited

U.S. PATENT DOCUMENTS

| | | | | | |
|---|---|---|---|---|---|
| 2,089,578 | A | * | 8/1937 | Schaefer | 411/61 |
| 2,334,268 | A | * | 11/1943 | Judge | 24/575.1 |
| 2,517,397 | A | * | 8/1950 | McClain | 411/513 |
| 2,543,414 | A | * | 2/1951 | Maclean, Jr. et al. | 411/514 |
| 2,631,487 | A | * | 3/1953 | Maclean, Jr. et al. | 411/513 |
| 6,126,372 | A | * | 10/2000 | Takata | 411/513 |

* cited by examiner

*Primary Examiner*—Gary Estremsky
(74) *Attorney, Agent, or Firm*—Mark W. Croll; Paul F. Donovan

(57) ABSTRACT

A cotter pin includes first and second tines having flat confronting surfaces and curved side surfaces with flat outer surfaces substantially parallel to the flat confronting surfaces thereof.

12 Claims, 1 Drawing Sheet

COTTER PIN

FIELD OF THE INVENTION

The present invention relates generally to fastening devices and securing pins in fasteners; and, more specifically, the present invention relates to the design and configuration of cotter pins.

BACKGROUND OF THE INVENTION

Cotter pins are used frequently to secure the position or location of a movable body relative to another body when strength is not of primary importance. A well-known form of a cotter pin includes an elongated body folded back on itself to provide a loop or head with tines extending therefrom parallel to one another. Frequently, one of the tines is longer than the other. When new, the tines of a cotter pin lie closely adjacent each other. In cross-section, the tines are solid semi-cylinders and the appearance in end view of the tines overlying each other is that of a split cylinder.

In a known application for a cotter pin, the pin is inserted through a hole in a shaft or other body, with the looped head of the cotter pin disposed against the body at the entrance to the hole. At the opposite side of the body, the tines projecting through the hole are bent in opposite directions to prevent the cotter pin from being extracted from the hole unless the tines are straightened. The bends in the tines are formed closely adjacent the body so that the cotter pin has limited axial movement, being restrained by the head against one side of the body and by the bends of the tines on the opposite side of the body.

Cotter pins have been used to retain sleeves, washers and other bodies on shafts and have been used as locking keys to further secure the location of a nut on a threaded shaft or bolt against unintended movement or "walking" along the threads. Other examples of the use of cotter pins include use to restrain clevis pins, hitch pins and the like from unintended extraction, and securing loosely fitting control arms on shafts and bodies of various types. Accordingly, cotter pins are provided in many different sizes, both in overall length and in the diameter of the overlying tines, from very short and thin to relatively long and thick.

Known cotter pins are simple devices that are manufactured quite easily. Accordingly, a significant portion of the manufacturing cost involved in providing cotter pins is in the cost of the material from which the cotter pin is made. Cotter pins are often made of steel and other expensive metals. It is desirable to reduce the cost of cotter pins, which often are used only one time and discarded if removed, being replaced by a new cotter in the reassembled device.

Even as simple as cotter pins are, difficulties can be encountered in the installation of known cotter pins, particularly with larger cotter pins. As described previously, a cotter pin is inserted through a hole. In a preferred arrangement, the hole is only minimally wider than the tines of the cotter pin. If the shaft or other body on which the cotter pin is used is of relatively large diameter, the hole therethrough is quite long. It is desirable that the cotter pin fit relatively snuggly within the hole so that it does not move and wear unnecessarily during use. According, a substantial portion of the surface area of the tines in the hole frictionally engages the surface of the hole as the cotter pin is inserted. Since known cotter pins have been in the configuration of split cylinders, sliding a large cotter pin through a long receiving hole can require significant force, especially if the opposed tines are separated slightly providing outward force against the inner surface of the hole. Further, the tines of large cotter pins are relatively thick and can be difficult to bend, particularly if the cotter pin is in an area of limited accessibility.

What is needed is a cotter pin design that can be used for cotter pins of various sizes to manufacture cotter pins less expensively than known designs and to facilitate the use of cotter pins.

SUMMARY OF THE INVENTION

The present invention provides a cotter pin having a modified cross-sectional shape.

In one aspect thereof, the present invention provides a cotter pin with a first tine and a second tine overlying one another, and a loop interconnecting the first and second tines. The first and second tines have substantially flat confronting surfaces. The first and second tines each have curved side surfaces on opposite sides thereof. First side surfaces of the first and second tines are adjacent each other, and second curved sides of the first and second tines are adjacent each other. The first tine and the second tine each have flat outer surfaces between the curved side surfaces thereof.

In another aspect thereof, the present invention provides a cotter pin with a monolithic body including a first tine, a second tine and a loop interconnecting the first and second tines. The tines co-extend adjacent each other in substantially overlying relationship. The first and second tines each have a substantially flat inner surface, the inner surfaces confronting each other. The first tine has first tine first and second curved side surfaces extending from opposite sides of the flat inner surface of the first tine. The second tine has second tine first and second curved side surfaces extending from opposite sides of the flat inner surface of the second tine. The first tine has a flat outer surface between the curved side surfaces thereof substantially parallel to the inner surface thereof, and the second tine has a flat outer surface between the curved side surfaces thereof and substantially parallel to the inner surface thereof.

In a still further aspect thereof, the present invention provides a cotter pin with an elongated monolithic body folded on itself to form a loop and first and second tines extending outwardly from the loop. The tines each having a distal end and a length from the loop to the distal end thereof. The tines co-extend adjacent each other in substantially overlying relationship and have substantially flat confronting surfaces. The first and second tines define a major diameter transverse to the length; and a minor diameter substantially normal to the major diameter, the minor diameter being less than the major diameter.

In yet another aspect thereof, the present invention provides a cotter pin with first and second tines in substantially overlying relationship, each tine having a substantially flat inner surface, and the inner surfaces confronting each other in the overlying relationship. The first tine has first tine first and second side surfaces on opposite sides of the inner surface of the first tine. The second tine has second tine first and second side surfaces on opposite sides of the inner surface of the second tine. The first and second tines each have an outer surface between the side surfaces thereof. The first and second tines define a major diameter between pairs of the side surfaces on opposite sides of the tines, and a minor diameter between the outer surfaces, the minor diameter being less than the major diameter.

The present invention provides a cotter pin that can be manufactured easily and inexpensively, at reduced expense compared to known designs for cotter pins.

Another advantage of the present invention is providing a cotter pin that can be inserted into a receiving hole with less force than cotter pins of similar size manufactured by known designs.

Still another advantage of the present invention is providing a cotter pin having tines that can be bent with less force than is required for bending tines of correspondingly sized cotter pins of known design.

Other features and advantages of the invention will become apparent to those skilled in the art upon review of the following detailed description, claims and drawings in which like numerals are used to designate like features.

Figure 1:
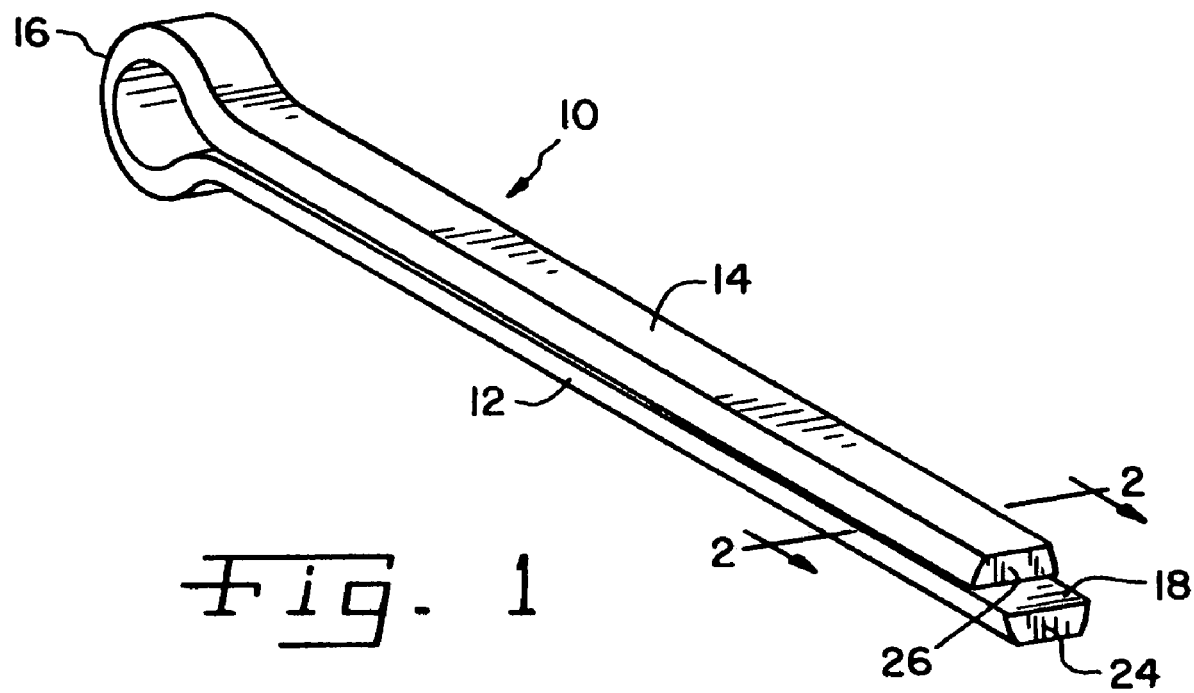
FIG. 1 is a perspective view of a cotter pin in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a cotter pin in accordance with the present invention. Cotter pin 10 can be understood as an elongated body doubled over on itself to form first and second overlapping, parallel tines 12 and 14 that are interconnected at one end by a loop 16. Cotter pin 10 can be made from a variety of different materials, including steel and other metals. Cotter pin 10 can be made in different sizes, both in overall length from the outer edge of loop 16 to the ends of tines 12 and 14. Loop 16 can be made of different sizes and shapes. Tines 12 and 14 also can be made in different lengths.

Tines 12 and 14 and loop 16 are one continuous or monolithic elongated body folded on itself, as can be seen from FIG. 1. In the exemplary embodiment, first tine 12 is slightly longer than second tine 14, revealing an exposed distal segment 18 to facilitate starting cotter pin 10 for entry in a hole and to provide a surface to facilitate splitting of tines 12 and 14 relative to each other to commence bending in opposite directions when cotter pin 10 is installed and locked in position in a receiving hole. Distal segment 18 provides a readily available surface for the application of force to commence bending first tine 12 even as tine 12 and 14 lie closely adjacent each other, thereby separating first tine 12 from second tine 14 and exposing second tine 14 for easier bending.

Figure 2:
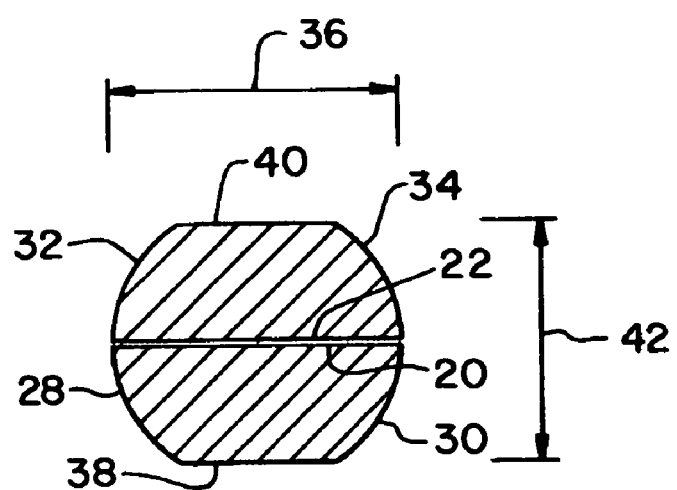
FIG. 2 is a cross-sectional view of the cotter pin shown in FIG. 1, taken along line 2-2 of FIG. 1.

With reference now to the cross-sectional view shown in FIG. 2, the shape and configuration of tines 12 and 14 will be described in greater detail. Various surfaces of tines 12 and 14 will be described herein and separately identified and described as if the surfaces were separate and distinct from each other. However, those skilled in the art should understand that cotter pin 10 is a monolithic, continuous body from the end of one tine 12, 14 to the end of the other tine 12, 14. Accordingly, the corresponding surfaces of tines 12 and 14 are actually a single continuous surface throughout cotter pin 10, leading from one tine 12, 14 to the other tine 12, 14 through loop 16.

Tines 12 and 14 include substantially flat confronting inner surfaces 20 and 22, respectively. In a new cotter pin 10 prior to first installation, inner surfaces 20 and 22 are immediately adjacent each other and may be in contact with each other throughout a substantial portion of the length of each from loop 16 to respective distal ends 24, 26 of tines 12 and 14, respectively.

First tine 12 includes first and second curved side surfaces 28, 30 on and along opposite sides of inner surface 20. Second tine 14 includes first and second curved side surfaces 32, 34 on and along opposite sides of inner surface 22. With reference to the cross-section orientation through tines 12 and 14, first curved surfaces 28 and 32 of tines 12 and 14 are adjacent each other, and second curved surfaces 30 and 34 are adjacent each other on the opposite side. Curved side surfaces 28, 30, 32 and 34 lie substantially along arcs of a cylinder having an axis centered between and along confronting inner surfaces 20 and 22. Thus, side surfaces 28, 30, 32 and 34 lie substantially along arcs of a cylinder formed if tines 12 and 14 were of known split cylinder design. The nominal diameter of cotter pin 10 is the same as if the standard cotter pin split cylinder design were used, the diameter being the width of confronting inner surfaces 20, 22 transverse to the length of the tines. The nominal diameter of cotter pin 10 is referred to herein as the major diameter and is illustrated by the line designated with number 36. As is apparent, diameters defined between curved side surfaces 28, 30, 32 and 34 opposite each other are the same as the width of tines 12, 14 transverse to the lengths of the tines, and define major diameters of tines 12 and 14.

Tines 12 and 14 define flat outer surfaces 38, 40 respectively. Flat outer surface 38 extends between curved side surfaces 28 and 30 of tine 12 and flat outer surface 40 extends between curved side surfaces 32, 34 of second tine 14. Outer surfaces 38, 40 are substantially parallel to inner surfaces 20, 22. Accordingly, while a nominal major diameter of the cross-section of tines 12 and 14 is defined along confronting surfaces 20, 22, as indicated by 36, a minor diameter less than the major diameter is defined between outer surfaces 38 and 40. The minor diameter is illustrated by the line identified with the number 42. The minor diameter of cotter pin 10 is less than the diameter of a cylinder defined by a known cotter pin of split cylinder design in the same size.

By reducing the minor diameter of the cotter pin, material requirements are reduced. Accordingly, a cotter pin of the present invention can be manufactured less expensively than standard cotter pins having a split cylinder design.

Since the major diameter 36 defined along confronting surfaces 20, 22 is the same as for a standard cotter pin of that size, a cotter pin of the present invention can be used in standard applications having cylindrical pilot holes. Cotter pin 10 will fit in the pilot hole firmly and securely, in similar fashion to a standard cotter pin of split cylinder design. However, only side surfaces 28, 30, 32 and 34 can contact the inside of the receiving hole, therefore less surface of cotter pin 10 is in direct contact with the inner surface of the receiving hole than for a standard cotter pin of split cylinder design. Less frictional resistance is generated as cotter pin 10 is inserted, and a cotter pin of the present invention can be inserted with less force than a standard cotter pin of split cylinder design.

Following insertion of cotter pin 10 into the receiving hole, cotter pin 10 is secured by bending tines 12, 14 in opposite directions away from each other, generally through the thickness of each tine 12 or 14 defined between the respective inner surface 20 or 22 and the associated outer surface 38, 40 of the tine 12, 14. Since minor diameter 42 is less than the diameter of similarly sized known cotter pins of split cylinder design, less force is required to bend each tine 12, 14 in opposite directions than is required for known cotter pins of split cylinder design.

A cotter pin 10 of the present invention to replace a so-called "⅛ inch" standard, split cylinder cotter pin has a major diameter 36 of approximately 0.12 inch, the same as for a standard cotter pin of split cylinder design for insertion into a ⅛ inch receiving hole. By way of example, if minor diameter 42 of cotter pin 10 is provided at approximately 0.08 inch (each tine 12, 14 having a thickness of about 0.04 inch between its inner surface 20 or 22 and it's outer surface 38 or 40, respectively), the calculated mass reduction of cotter pin 10 compared to a standard cotter pin of split cylinder design is approximately 22.45% and the surface area reduction is approximately 21.91%. Modeling and testing have shown that a cotter pin 10 configured in this way will meet current established standards for ductility. Choosing a minor diameter 42 of greater or lesser length will decrease or increase the amount of material saved. Minor diameters 42 greater or less than that described will also meet current established standards for ductility.

A cotter pin 10 of the present invention to replace a so-called "¼ inch" standard, split cylinder cotter pin has a major diameter 36 of approximately 0.225 inch, the same as for a standard cotter pin of split cylinder design for insertion into a ¼ inch receiving hole. By way of example, if minor diameter 42 of cotter pin 10 is provided at approximately 0.150 inch (each tine 12, 14 having a thickness of about 0.075 inch between its inner surface 20 or 22 and it's outer surface 38 or 40, respectively), the calculated mass reduction of cotter pin 10 compared to a standard cotter pin of split cylinder design is approximately 22.54% and the surface area reduction is approximately 21.93%. Modeling and testing have shown that a cotter pin 10 configured in this way will meet current established standards for ductility. Choosing a minor diameter 42 of greater or lesser length will decrease or increase the amount of material saved. Minor diameters 42 greater or less than that described will also meet current established standards for ductility.

Accordingly, as is apparent from the examples described above for ⅛ inch and ¼ inch cotter pins of the present invention, substantial savings in material are achieved with the present invention, frictional resistance to insertion can be generated only along side surfaces 28, 30, 32 and 34, and tines 12 and 14 are bent more easily because bending occurs through the thickness of each tine 12 and 14, which is less than the thickness of standard cotter pins of semi-cylinder configurations.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A cotter pin comprising:
   a monolithic body including a first tine, a second tine and a loop interconnecting said first and second tines;
   said tines co-extending adjacent each other in substantially overlying relationship, said tines having distal ends;
   said first and second tines each having a substantially flat inner surface, said inner surfaces confronting each other;
   said first tine having first tine first and second curved side surfaces extending from opposite sides of said flat inner surface of said first tine, and said second tine having second tine first and second curved side surfaces extending from opposite sides of said flat inner surface of said second tine, said inner surfaces of said tines being substantially entirely flat between said curved side surfaces; and
   said first tine having a flat outer surface extending from said loop to said distal end thereof and between said curved side surfaces thereof so as to be substantially parallel to said inner surface thereof, and said second tine having a flat outer surface extending from said loop to said distal end thereof and between said curved side surfaces thereof so as to be substantially parallel to said inner surface thereof.

2. The cotter pin of claim 1, said monolithic body being made of steel.

3. The cotter pin of claim 2, one of said tines being longer than the other of said tines from said loop to said distal ends thereof.

4. The cotter pin of claim 1, one of said tines being longer than the other of said tines from said loop to said distal ends thereof.

5. The cotter pin of claim 1, said curved side surfaces of said first and second tines substantially defining arcs of a cylinder.

6. The cotter pin of claim 1, said loop including a substantially flat outer surface extending between two sides.

7. A cotter pin comprising:
   an elongated monolithic body folded on itself to form a loop and first and second tines extending outwardly from said loop;
   said tines each having a distal end and a length from said loop to said distal end thereof;
   said tines co-extending adjacent each other in substantially overlying relationship and having substantially flat confronting surfaces;
   said first and second tines defining a major diameter transverse to said length; and
   said first and second tines defining a minor diameter substantially normal to said major diameter, said minor diameter being less than said major diameter;
   wherein said tines have curved side surfaces substantially defining arcs of a cylinder, and a diameter of said cotter pin being defined between pairs of said curved side surfaces on opposite sides of said tines being substantially equal to said major diameter; and
   wherein prior to being folded, said body has a flat upper surface, a flat bottom surface and curved side surfaces extending between said upper and bottom surfaces, said upper surface having a first dimension extending from side to side and said bottom surface having a second dimension extending from side to side, such that said first dimension is greater than said second dimension.

8. The cotter pin of claim 7, said monolithic body being made of steel.

9. The cotter pin of claim 7, said length of one of said tines being greater than said length of the other of said tines.

10. The cotter pin of claim 9, said monolithic body being made of steel.

11. A cotter pin comprising:

first and second tines in substantially overlying relationship, each said tine having a substantially flat inner surface, and said inner surfaces confronting each other in said overlying relationship;

said first tine having first tine first and second curved side surfaces on opposite sides of said inner surface of said first tine, and said second tine having second tine first and second curved side surfaces on opposite sides of said inner surface of said second tine, said curved side surfaces of said first and second tines substantially defining arcs of a cylinder;

said first and second tines each having an outer surface between said side surfaces thereof, said outer surfaces being substantially flat; and said first and second tines defining a major diameter between pairs of said side surfaces on opposite sides of said tines, and a minor diameter between said outer surfaces, said minor diameter being less than said major diameter.

12. The cotter pin of claim 11, said outer surfaces being substantially parallel to said inner surfaces.

* * * * *